B. A. OEHLER.
CALENDAR.
APPLICATION FILED DEC. 4, 1915.

1,207,987.

Patented Dec. 12, 1916.

Fig. 1.

| 1916 DECEMBER 1916 | | | | | | |
|---|---|---|---|---|---|---|
| SUN | MON | TUE | WED | THU | FRI | SAT |
|  |  |  |  |  | 1 | 2 |
| 3 | 4 | 5 | MEETING | 7 | 8 | 9 |
| 10 | 11 | 12 | 13 | 14 | 15 | 16 |
| 17 | 18 | 19 | MEETING | 21 | 22 | 23 |
| 24 | 25 | 26 | 27 | 28 | 29 | 30 |
| 31 |  |  |  |  |  |  |

Fig. 2.

| 1916 JUNE 1916 | | | | | | |
|---|---|---|---|---|---|---|
| SUN | MON | TUE | WED | THU | FRI | SAT |
|  |  |  |  | 1 | 2 | 3 |
| 4 | 5 | 6 | 1 | 8 | 9 | 10 |
| 11 | 12 | 13 | 14 | 15 | 16 | 17 |
| 18 | 19 | 20 | 1 | 22 | 23 | 24 |
| 25 | 26 | 27 | 28 | 29 | 30 |  |
|  |  |  |  |  |  |  |

Fig. 3.

| 1916 — JANUARY — 1916 | | | | | | |
|---|---|---|---|---|---|---|
| SUN | MON | TUE | WED | THU | FRI | SAT |
|  |  |  |  |  |  | 1 |
| 2 | 3 | 4 |  | 6 | 7 | 8 |
| 9 | 10 | 11 | 12 | 13 | 14 | 15 |
| 16 | 17 | 18 |  | 20 | 21 | 22 |
| 23 | 24 | 25 | 26 | 27 | 28 | 29 |
| 30 | 31 |  |  |  |  |  |

Attest:
Charles A. Becker.
Anna E. Brockmeier.

Inventor,
Benjamin A. Oehler,
by Small & Small
His Attorneys.

UNITED STATES PATENT OFFICE.

BENJAMIN A. OEHLER, OF ST. LOUIS, MISSOURI.

CALENDAR.

1,207,987.  Specification of Letters Patent.  Patented Dec. 12, 1916.

Application filed December 4, 1915. Serial No. 65,094.

*To all whom it may concern:*

Be it known that I, BENJAMIN A. OEHLER, a citizen of the United States of America, residing at St. Louis, in the State of Missouri, have invented a certain new and useful Improvement in Calendars, of which the following is a specification.

This invention relates primarily to calendars adapted for use by members of fraternal societies, clubs and other organizations for the purpose of constantly indicating the days and dates upon which meetings are held, and has for its object the provision of simple and effective means to attain this end.

Referring to the accompanying drawing, wherein like numerals refer to like parts throughout the several views, Figure 1 is a plan view of the last sheet of my improved calendar; Fig. 2, a plan view depicting the typical arrangement of all of the other sheets of the calendar; and Fig. 3, a plan view of the complete calendar.

In the drawing it will be observed that the days of meeting selected for purposes of illustration are the first (1st) and third (3rd) Wednesdays of each month, but it will be understood that any other days may be selected and either one day in each month or several days.

In the practice of my invention the leaves of the ordinary calendar pad will not suffice, as the dates printed thereon with respect to particular days and dates do not fall in register; hence, I reorganize the sheet for each of the months in such manner that when they are superposed and perforated, the perforation on "window" 1 will be directed through the same day or days in each month, as for example, the first (1st) and third (3rd) Wednesday in the calendar shown in the annexed illustration. Being thus perforated, the word "Meeting" which is shown in Fig. 1 as printed or otherwise displayed (as by a detachable tag) on the December sheet will be visible as a constant reminder throughout the year. It will, of course, be understood that I do not propose to limit myself to the word "Meeting" and may use in lieu thereof any other word found desirable in particular cases.

Having thus fully described my invention, what I claim as new and desire to secure by Letters-Patent is:—

A calendar comprising a series of superposed sheets having the days of the month and their respective dates printed thereon and apertures formed therein in lieu of certain dates, each of said sheets being so arranged with reference to the others that the same weekly period in each month is in register throughout the calendar, and a notice displayed on the last of said sheets in the location of said period and visible through said apertures.

BENJ. A. OEHLER.

Witnesses:
W. KEANE SMALL,
ANNA E. BROCKMEIER.

Copies of this patent may be obtained for five cents each, by addressing the "Commissioner of Patents, Washington, D. C."